Nov. 28, 1933.  R. H. MUELLER  1,936,852
METER HANGER
Filed July 30, 1932
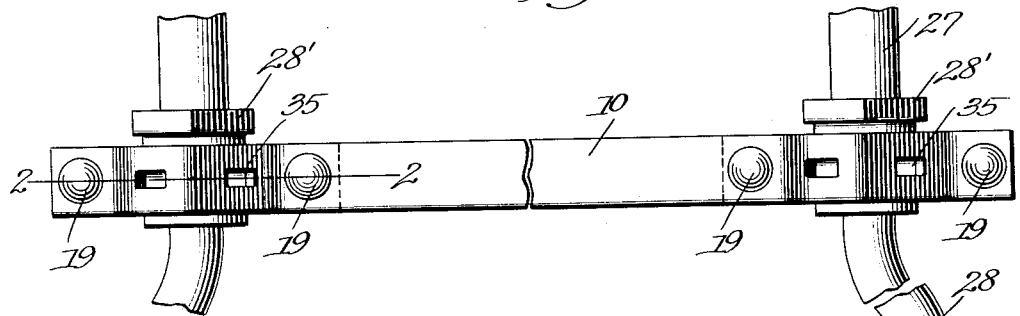
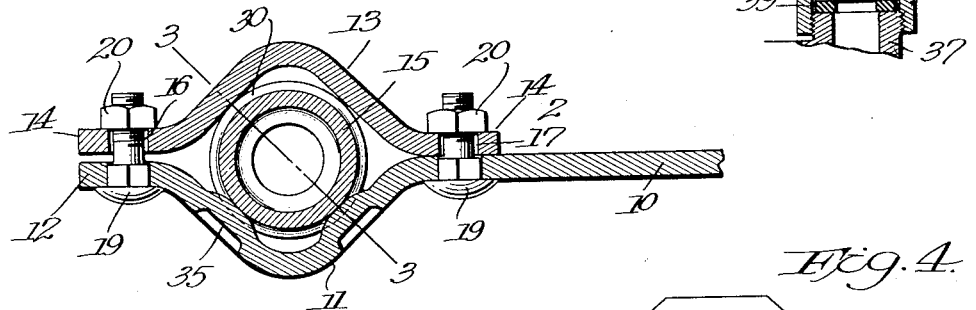
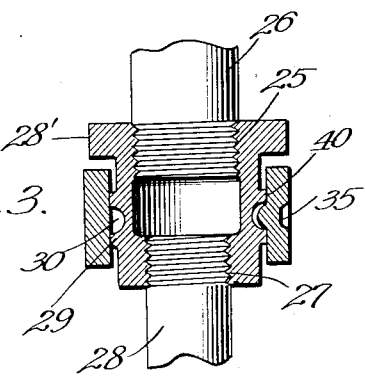
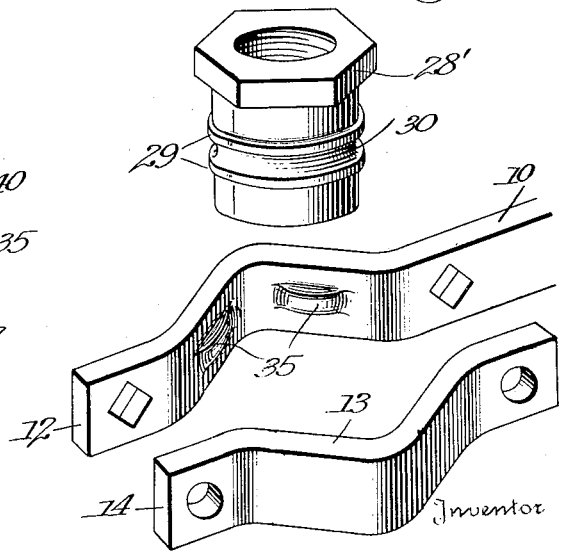
Inventor
Robert H. Mueller Patented Nov. 28, 1933

1,936,852

UNITED STATES PATENT OFFICE 1,936,852

METER HANGER

Robert H. Mueller, Decatur, Ill., assignor to Mueller Co., Decatur, Ill., a corporation of Illinois Application July 30, 1932. Serial No. 626,971

7 Claims. (Cl. 248—30)

My invention relates to meter hangers and particularly those adapted for use in spacing and supporting the pipes and connections associated with gas meters.

The principal object of the invention is to provide a meter hanger wherein the connections are securely clamped in position and sustained against any possibility of breakage due to strain which is usually incident to installations of this character.

An additional object of the invention is to provide a construction which is extremely simple and inexpensive and which particularly may be applied with a minimum of effort and by unskilled labor.

The invention comprises a suitable bar having at one or both ends an independent clamping means associated with the bar, as distinguished from a single rigid bar having an opening therein.

The sleeve or bushing which connects the supply pipes and nipples is substantially T-shaped in cross-section, and has its body portion provided with an enlargement and a groove. In other words, a truly cylindrical sleeve is not employed since this has been found inadequate and productive of unusual strains on the threaded connections because of the necessity for a very accurate fitting.

Referring to the drawing,

Figure 1 is a side elevation,

Figure 2 is a top view in section,

Figure 3 is a side view in section, and

Figure 4 is a perspective view of the detailed parts.

The bar 10 will be constructed of strip metal of suitable thickness to be substantial in accordance with the needs of a hanger bar of this type, and at each end thereof is bowed outwardly as shown at 11. The extremity 12 of the bar is substantially in line with the body portion 10 as shown so that the bowed-out portion is arranged adjacent one end of the bar or intermediate the ends thereof.

An independent clamping member 13 is associated with the bar and as shown is bowed outwardly to have a configuration substantially corresponding to the bowed portion 11 of the bar proper. The bowed portion of member 13 may be slightly less than that of the bar or vice versa. The ends of the independent member 13 are preferably arranged to extend straight, as shown at 14. The interior of the independent clamping member 13 and the interior of the bowed portion 11 provide substantially angular opposed clamping jaws for a bushing or coupling 15 which will be later described.

The respective clamping members are provided with substantially aligned openings 16 and 17 adapted to receive bolts 19 upon the ends of which are threaded nuts 20. Preferably the space defined by the clamping jaws is slightly less than the diameter of the bushing 15 so that while the clamping member 13 at one side will be held flush and in contact with the adjacent surface of the bar 10, as shown at 20, the opposite end of the clamping member 13 when clamped about the bushing will not contact with the adjacent side of the bar, and hence the nut 20 may be screwed up to tighten the clamp about the bushing. In this connection it will be noted that the openings in the clamping member 13 are larger than the diameters of the bolts so that no stripping of the threads will be possible. Furthermore, the clamping member 13 will be formed of strip metal similar to that of which the bar 10 is composed, or it may be of a more rigid or more resilient material. Preferably the clamping member 13 is of the same vertical and transverse dimension as the bar and at the ends will terminate flush with the end of the bar.

Referring to Figure 2, it will be understood that a suitable supporting hanger may be suspended from each bolt 19 in the space between the ends of the bar and clamping members to support a shelf beneath the meter.

The bushing is illustrated best in Figures 3 and 4, and is provided with internal screw threads 25 to engage the threads on a supply pipe 26. At the opposite end the bushing is provided with similar internal threads 27 adapted to engage threads upon the usual nipple 28. The bushing or coupling is preferably of larger internal diameter at its upper end where it engages the supply pipe than at the lower end where it engages the nipple, as shown in Figure 3.

Referring to Figure 4, the sleeve at its upper end is provided with a polygonal wrench-receiving or turning portion 28' and intermediate its ends is formed with a circular enlargement or bulge 29. This bulge or enlargement 29 is provided with a peripheral groove 30 for a purpose which will now be described.

From the invention as thus set forth, it will be observed that the meter bar comprises a separable clamping member and is adapted for association with a bushing, the form of which is irregular, i. e., it is not cylindrical in the true sense.

I have illustrated in Figure 1 similar connections at each end of the bar, but it will be understood that at either end thereof other suitable means may be employed for establishing communication with the meter.

The wall of the bowed portion 11 is pressed in at one or more points as shown at 35, to produce inwardly extending lugs which, as illustrated, are spaced apart and engage the coupling or bushing at two points. These lugs are preferably of a size as indicated in Figure 3, to be freely received in the groove 30 formed in the bulge 29 of the coupling member.

Instead of having the inbent lugs formed in the opposite angular sides of the bowed portion of the bar, I may form them in the opposite angular sides of the bowed portion of the clamping member 13, or I may form one or more internal lugs in each of the opposed clamping surfaces.

In the practical use of the invention, it will be made up at the factory to comprise the bar with associated clamping members and the bushing, and in some cases the nipples 28 may be also assembled with the article as prepared for sale. At the point of application, the clamping members 13 are released and the bushing is rotated by means of the wrench engaging the portion 28' to establish threaded connection with the supply pipes. If the nipple is already attached to the coupling member or bushing it is only necessary to apply the coupling nut 36 to the meter spud 37, and it will be observed that the nipple is provided with a flange 38 between which and the surface of the spud 37 is interposed a flexible, i. e., compressible and resilient washer 39.

Where the nipple is not previously connected to the bushing, after the connections with the supply pipes have been established, the nipples may be readily threaded into the lower threaded portion of the coupling, and then attached to the meter spud through the medium of the coupling nut 36.

Thereafter the clamping members 13 are tightened as shown in Figure 2.

While the clamping means may be adjusted so that the bushing may be rotatably mounted between the clamping jaws, being guided in rotation by the engagement of the lugs 35 in the groove 30, the workmen will usually loosen the clamping members, thread the bushing to the service pipe, and thereupon clamp the bar about the bushing.

It is to be observed that the polygonal portion 28' is primarily for the purpose of enabling a wrench to be applied, and is quite conventional.

The provision of a compressible washer 39 enables any misalignment of the nipples to be absorbed by reason of the resilient or compressible packing.

The clamping jaws, it will be observed, as shown in Figure 3, are adapted to have line contact at spaced points with the adjacent upper and lower surfaces of the enlargement or bulge 29, as indicated at 40. In other words, the bushing is clamped at its enlarged portion and a face to face substantially tangential contact is provided whereby the coupling is rigidly maintained in position.

Referring to Figure 4, while I have indicated the enlargement 29 as being substantially circular, it will be understood that this contour may be modified in any manner to obtain a proper clamping action and is not restricted to a circular formation. For instance, the enlargement may be polygonal so as to present flat sides to the respective angular flat surfaces of the opposed clamping members.

Also the space between the enlargement and the ends of the bushing may have any desired configuration and while I have shown it as substantially circular, it will be understood that likewise this is not an essential feature of the invention and the contour may be modified as desired.

Further objects and advantages of the invention will appear, and it is to be understood that the construction shown may be modified within the meaning of the appended claims.

I claim:

1. A meter hanger comprising a bar, a separable clamping member associated with the bar, a bushing adapted to have threaded connection with a supply pipe and a coupling nipple and provided with an annular recess, said bar and clamping member constituting a clamp for the bushing, and spaced projections on said clamp engaging in said recess.

2. A meter hanger comprising a bar, a separable clamping member associated with the bar, a bushing adapted to have threaded connection with a supply pipe and a coupling nipple, an enlargement on said bushing provided with a recess, said bar and clamping member constituting a clamp for the bushing, and means on said clamp engaging in said recess.

3. A meter hanger comprising a bar, a separable clamping member associated with the bar, a bushing adapted to have threaded connection with a supply pipe and a coupling nipple, an enlargement on said bushing provided with a recess, said bar and clamping member constituting a clamp for the bushing, and a projection on said clamp engaging in said recess.

4. A meter hanger comprising a bar, a separable clamping member associated with the bar, a bushing adapted to have threaded connection with a supply pipe and a coupling nipple, an enlargement on said bushing of substantially cylindrical formation, provided with a recess, said bar and clamping member constituting a clamp, one section of which is provided with substantially flat portions adapted to make line contact with the outer wall of said enlargement, and a projection on the other of said clamping sections engaging in said recess.

5. A meter hanger comprising a bar, a separable clamping member associated with the bar, a bushing adapted to have threaded connection with a supply pipe and a coupling nipple, an enlargement on said bushing of substantially cylindrical formation provided with an annular recess, said clamping member having substantially flat clamping portions adapted to make line contact with the outer wall of said enlargement, and spaced projections on said bar adapted to engage in said recess.

6. A meter hanger comprising a bar, a separable clamping member associated with the bar, a bushing adapted to have threaded connection with a supply pipe and a coupling nipple, said bushing provided with an enlargement of substantially cylindrical formation, projecting beyond the adjacent surface of the bushing, said bar and clamping member constituting a clamp having substantially flat clamping portions of greater width than the enlargement and spaced from the body portion of the bushing whereby when pressure is applied to the clamp the enlargement tends to produce a biting engagement with the clamping portions.

7. A meter hanger comprising a bar, a separable clamping member associated with the bar, a bushing adapted to have threaded connection with a supply pipe and a coupling nipple, said bushing being provided with spaced rings of cylindrical formation, said bar and clamping member constituting a clamp having substantially flat clamping portions of greater width than the combined width of said rings and spaced from the body portion of the bushing whereby when pressure is applied to the clamp the rings tend to produce a biting engagement with the clamping portions.

ROBERT H. MUELLER.